US010179825B2

(12) United States Patent
Matsko

(10) Patent No.: US 10,179,825 B2
(45) Date of Patent: Jan. 15, 2019

(54) BATTERY POWERED PORTABLE PAINT SYSTEM

(71) Applicant: Joseph J. Matsko, Hardeeville, SC (US)

(72) Inventor: Joseph J. Matsko, Hardeeville, SC (US)

( * ) Notice: Subject to any disclaimer, the term of this patent is extended or adjusted under 35 U.S.C. 154(b) by 0 days.

(21) Appl. No.: 15/817,232

(22) Filed: Nov. 19, 2017

(65) Prior Publication Data

US 2018/0093295 A1    Apr. 5, 2018

Related U.S. Application Data

(62) Division of application No. 15/075,162, filed on Mar. 20, 2016.

(60) Provisional application No. 62/184,451, filed on Jun. 25, 2015.

(51) Int. Cl.
| | |
|---|---|
| *B05C 17/00* | (2006.01) |
| *C08F 2/34* | (2006.01) |
| *B01J 12/00* | (2006.01) |
| *C08F 2/01* | (2006.01) |
| *A46B 11/06* | (2006.01) |
| *B05C 17/005* | (2006.01) |
| *C08F 2/00* | (2006.01) |
| *C08F 210/02* | (2006.01) |

(52) U.S. Cl.
CPC ............. *C08F 2/34* (2013.01); *A46B 11/06* (2013.01); *B01J 12/00* (2013.01); *B05C 17/00503* (2013.01); *B05C 17/00569* (2013.01); *B05C 17/00573* (2013.01); *C08F 2/00* (2013.01); *C08F 2/01* (2013.01); *C08F 210/02* (2013.01); *Y02P 20/582* (2015.11)

(58) Field of Classification Search
CPC ............ B05C 17/002; B05C 17/00569; B05C 17/0333; B05C 17/0341; B05C 17/00; B05C 17/0316; B05B 9/0833; B05B 9/08
USPC ........................................................ 401/266
See application file for complete search history.

(56) References Cited

U.S. PATENT DOCUMENTS

| | | | | |
|---|---|---|---|---|
| 3,015,837 A | * | 1/1962 | Teall .......................... | B05B 9/01 118/118 |
| 3,304,573 A | * | 2/1967 | Stefely .................. | B05C 17/002 401/187 |
| 3,321,795 A | * | 5/1967 | Richardson ......... | B05C 17/0308 401/197 |
| 3,503,691 A | * | 3/1970 | Kirch ..................... | B05C 17/002 401/188 R |
| 3,640,630 A | * | 2/1972 | Walker .................. | A46B 11/063 401/188 R |
| 3,960,294 A | * | 6/1976 | Bernard ............ | B05C 17/00516 222/103 |

(Continued)

*Primary Examiner* — Jennifer C Chiang
*Assistant Examiner* — Bradley Oliver
(74) *Attorney, Agent, or Firm* — John G. Posa; Belzer PC

(57) ABSTRACT

A portable electric (battery) powered paint system designed to worn in a typical workman's tool belt and thus accompany the painter as he moves from wall to wall and room to room without the restriction of electrical cords plugged into wall outlets. The invention consists of a paint reservoir, an electric paint pump, a power pack of two or more 18 Volt batteries, a paint applicator and associated paint supply tubing for transfer of paint from the reservoir to the paint applicator. The invention provides the painter with a self-contained powered painting system.

6 Claims, 5 Drawing Sheets

(56) References Cited

U.S. PATENT DOCUMENTS

| | | | | |
|---|---|---|---|---|
| 4,611,941 A * | 9/1986 | Karliner | ................ | B05C 17/002 15/145 |
| 4,639,156 A * | 1/1987 | Stern | .................... | B05C 17/002 200/83 Z |
| 4,822,194 A * | 4/1989 | Simonette | ................ | B05C 1/06 15/144.1 |
| 5,054,947 A * | 10/1991 | Frank | .................. | B05C 17/0333 401/146 |
| 7,717,354 B1 * | 5/2010 | Robinson | .................. | A45F 5/02 239/1 |
| 9,486,063 B2 * | 11/2016 | Roman | ............. | B05C 17/00573 |
| 2005/0232684 A1 * | 10/2005 | Giacomo | ............. | B05C 17/002 401/136 |
| 2007/0217856 A1 * | 9/2007 | Kott | ....................... | A46B 9/005 401/48 |
| 2010/0316433 A1 * | 12/2010 | Castellana | ......... | A46B 11/0006 401/268 |

* cited by examiner

BATTERY POWERED PORTABLE PAINT SYSTEM

CROSS REFERENCE TO RELATED APPLICATIONS

Non-provisional patent application Ser. No. 15/075,162
Filing Date: Mar. 20, 2016
Relationship: This application is a divisional application from the above referenced patent application.
Provisional Patent Application Ser. No. 62/184,451
Filing Date: Jun. 25, 2015
Relationship: Provisional application was for the same invention

STATEMENT REGARDING FEDERALLY SPONSORED RESEARCH OR DEVELOPMENT

This invention was not made by an agency of the United States Government nor under a contract with an agency of the United States Government.

PARTIES TO JOINT RESEARCH AGREEMENT

Not Applicable.

REFERENCE TO SEQUENCE LISTING

Not Applicable.

FIELD OF THE INVENTION

The present invention is directed to a belt-worn painting system that uses a portable motive source for transferring paint from a reservoir tank through a supply hose to a wand held by the painter. The applicator tool (either a brush, roller or cut-in tool) is attached to the end of the wand device or to an extension tube, which is then attached to the end of the wand. The motive source for the paint is a battery powered electric pump, which is activated via a switch on the wand, to pump paint from the reservoir tank to the applicator tool.

BACKGROUND OF THE INVENTION

Conventional painting techniques employ brushing, rolling, spraying paint onto a surface to be coated. Brushing is, perhaps, the oldest of the conventional techniques. Brushing involves the dipping of brushes of various sizes into a container of paint to collect paint onto the brush bristles and then moving the paint laden bristles along the surface to be painted which transfers paint from the brush to the desired surface. The bristles of a traditional paint brush are sometimes replaced by a section of sponge to create a foam or sponge paint brush, which is used in essentially the same manner as a traditional paint brush.

Rolling paint involves the coating of a roller with paint in a tray or a pail to collect paint on the roller and then rolling the roller along the surface to be painted which transfers the paint from the roller to the desired surface. Rollers can be of various sizes and the size used generally depends on the dimensions of the surface to be painted. Additionally, paint may be applied using a flat surfaced cut in tool in small areas or areas where precision of application is desired.

Both rolling and sponging can be a time consuming and labor intensive effort as only a finite quantity of paint can be transferred from the paint source container to the surface desired to be painted by the brush or the roller. The brush or roller must be returned to the source container and more paint collected to continue the application of paint to the desired surface. This repetitive action must be repeated many times to completely cover the desired surface and is thus both time consuming and labor intensive.

Spray painting involves the release of paint from a pressurized container through a nozzle that breaks up the paint into fine-misted droplets. Paint is propelled from the nozzle to the surface to be coated. Although spray painting is both a faster and less labor intensive means of painting a surface is has the disadvantage of propelling paint droplets in undesired directions and coating surfaces other than the desired surface.

The desire to reduce the time consumption and labor intensiveness associated with traditional brush and roller painting techniques yet eliminate the spatter concerns and imprecision of spray painting led to the invention of powered paint roller systems as described in U.S. Pat. No. 3,933,415—Painting System (granted to John C. Woolpert on Jan. 20, 1976). The Woolpert patent describes a painting system in which the paint is fed to the paint applicators from a pressurized container. The container has pressurized water on one side of an internal membrane and paint on the other. The hydraulic pressure on the membrane is used to push the paint out of the container through tubing to the paint applicators.

Currently on the market are a variety of electric powered paint roller systems from manufacturers such as Wagner®, Black and Decker® and Ryobi®. These systems typically use an electric pump to transfer paint from the paint can through tubing to an applicator. The electric pump is powered from a wall electrical outlet and the pump and the paint can sit on the floor with long tubing connecting them to the paint applicator. The disadvantage of units such as these is that they restrict the movement of the painter around the room or from room to room. To move farther than allowed by the paint supply tubing, the painter must reposition the unit to another location. Although these units are significantly more efficient with regard to time consumption and labor expenditure than the traditional manual methods of painting with a roller or a brush, they still restrict the painter movements around the room and from room to room, thus there is a need for a portable powered paint system.

BRIEF SUMMARY OF THE INVENTION

The invention described in this specification is a portable electric powered paint system designed to be worn in a typical workman's tool belt and thus accompany the painter as he moves from wall to wall and room to room without the restriction of electrical cords plugged into wall outlets. The invention consists of a paint reservoir, an electric pump, a paint supply tube that connects the reservoir to the electric pump inlet, a control wand, a paint hose that connects the outlet of the electric pump to the inlet of the control wand and a paint applicator connected to the outlet of the control wand. The electric pump is powered by a power pack made up of two 18 Volt batteries. The power pack is connected via electrical cable to a control switch on the control wand and to the electrical pump. The power pack, paint reservoir and electric pump are all sized to fit in the pockets of a typical workman's tool belt and with the associated electrical cables, paint hoses and tubing and applicator comprise a self-contained and portable painting system.

DETAILED DESCRIPTION OF THE INVENTION

Figure 1:
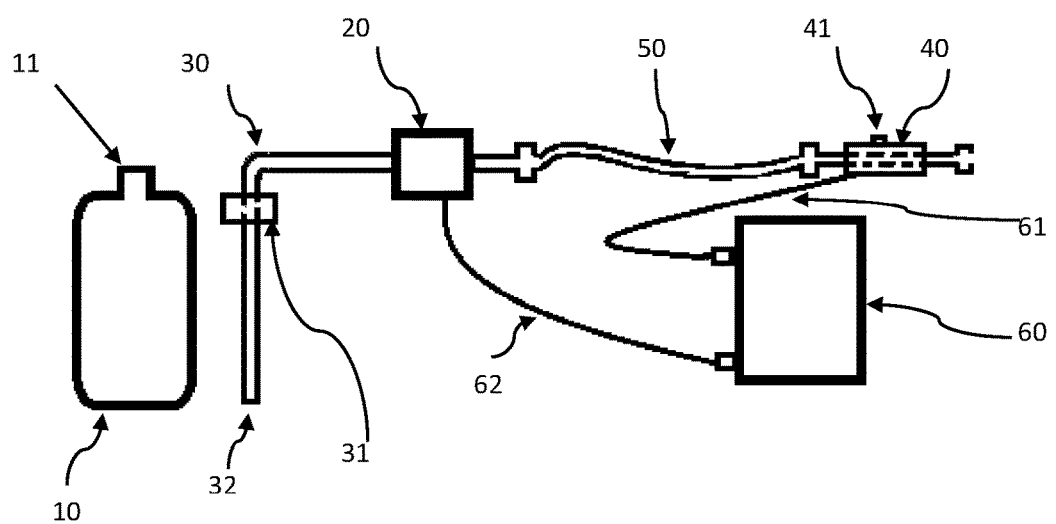
FIG. 1 illustrates the electrical powered paint system consisting of the paint reservoir (10), an electric paint pump (20), a supply tube (30) that conveys paint from the reservoir (10) to the inlet of the paint pump (20), a control wand (40), a paint hose (50) that conveys paint from the outlet of the paint pump (20) to the inlet of the control wand (40) and a power pack (60).

The invention described in this specification is a portable electric powered paint system designed to be worn in a typical workman's tool belt and thus accompany the painter as he moves from wall to wall and room to room without the restriction of electrical cords plugged into wall outlets or air hoses connected to an air compressor.

The invention consists of a paint reservoir (10), an electric paint pump (20), a paint supply tube (30) that connects the reservoir (10) to the electric pump (20) inlet, a control wand (40), a paint hose (50) that connects the outlet of the electric pump (20) to the inlet of the control wand (40) and a paint applicator connected to the outlet of the control wand (40). The electric pump is powered by a power pack (60) made up of two 18 Volt batteries. The power pack is connected via electrical cable (61, 62) to the control wand (40) and to the paint pump (20). The power pack, paint reservoir and electric pump are all sized to fit in the pockets of a typical workman's tool belt worn around the painter's waist and with the associated electrical cables, paint hoses and tubing and applicator comprise a self-contained and portable painting system.

The paint applicator, which may consist of a roller, brush or cut-in tool, can be directly connected to the outlet of the control wand (40) or to an extension tube of which one end is connected to the control wand (40). The extension tube may be of various lengths and is intended to allow the painter to apply paint to areas that are beyond arms length, such as a ceiling.

The electric paint pump (20) is a commercially available pump specifically designed for pumping paints, including both interior and exterior residential paints. A suitable paint pump is manufactured by Ryobi® LTD. Corporation. The pump (20) is powered by a power pack (60), which is comprised of two 18 Volt batteries. Suitable batteries are manufactured by Ryobi® LTD. Corporation. The power supply is controlled by an on-off switch (41) located on the control wand (40).

Paint is supply from the reservoir tank (10) to the electric paint pump (20) via a supply tube (30). The reservoir tank (10) has a top inlet/outlet (11), which is threaded to allow a screw on cap to be attached. The supply tube (30) is fitted with a screw-on cap (31), through which the supply tube runs. The dip-tube portion (32) of the supply tube, that is the portion of the supply tube (30) located below the screw on cap (31) is inserted into the reservoir tank (10). The screw on cap (31) is affixed to the reservoir tank outlet (11). The outlet of the supply tube (30) is attached to the inlet of the paint pump (20).

Figure 2:
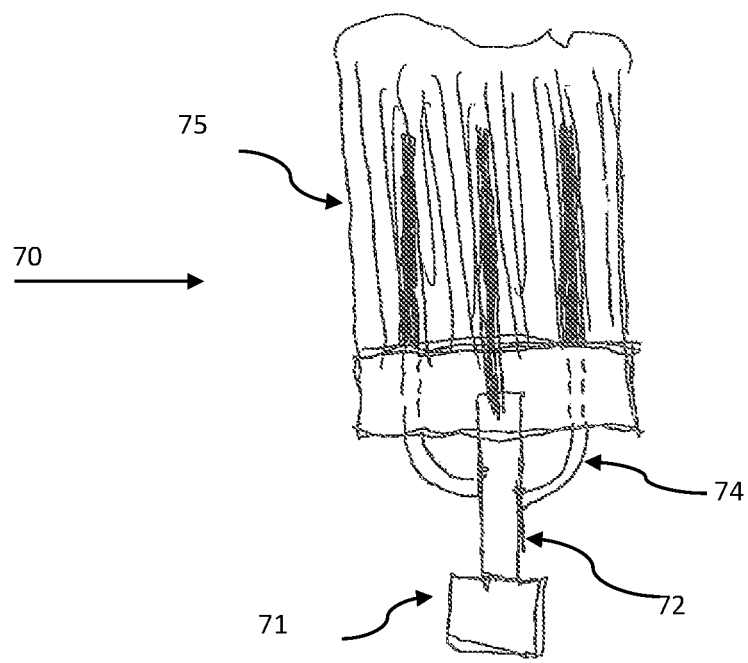
FIG. 2 illustrates a modified brush paint applicator (70) for use with the portable powered paint system. The brush applicator (70) attaches to the outlet end of the control wand (40) via a fitting (71) at the end of a central hollow tube (72). Three or more flexible tubes (73) are located amongst the brush bristles (75) and are supplied from the central tube (72) via branch tubes (74). Paint flows from the control wand (40) through the supply tubes (72-74) into the brush bristles (75) and is then spread onto the surface being painted. An extension tube may be used to connect the brush applicator (70) to the control wand (40).
Figure 3:
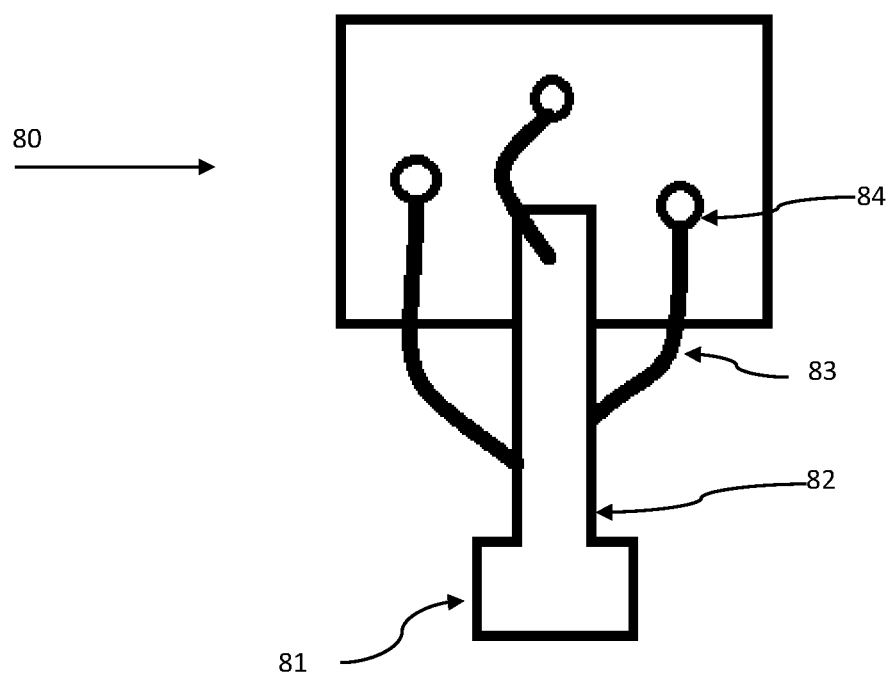
FIG. 3 illustrates the back side of a modified cut in tool (80). The tool (80) attaches to the outlet end of the control wand (40) via a fitting (81) at the end of a central hollow tube (82). Three or more flexible tubes (83) convey paint from the central tube (82) to distribution holes (84) cut through to the front of the tool. Paint flows from the control wand (40) onto the front surface of the tool (80) via the supply tubes (83) connected to the distribution holes (84).
Figure 4:
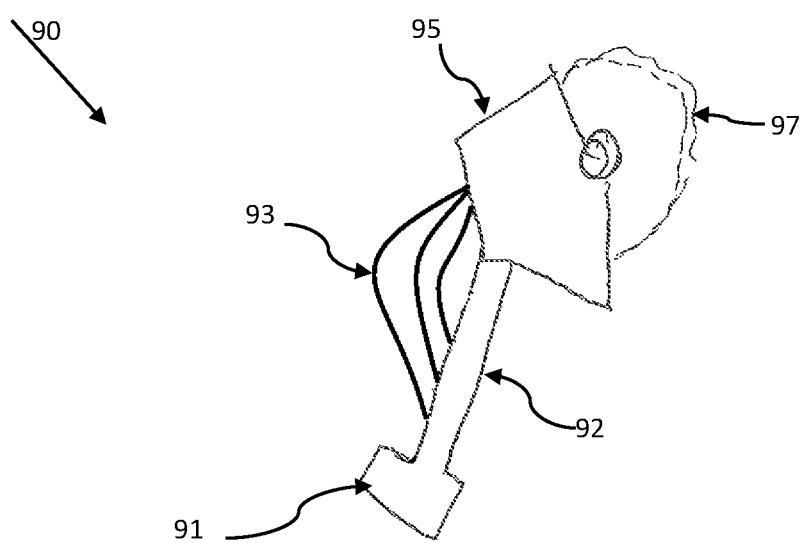
FIG. 4 illustrates a side view of a roller applicator. The applicator (90) attaches to the outlet end of the control wand (40) via a fitting (91) at the end of a central hollow tube (92). Multiple flexible tubes (93) convey paint from the central tube (92) to the paint trough (95) where paint is dispersed onto commercially available paint rollers (97).
Figure 5:
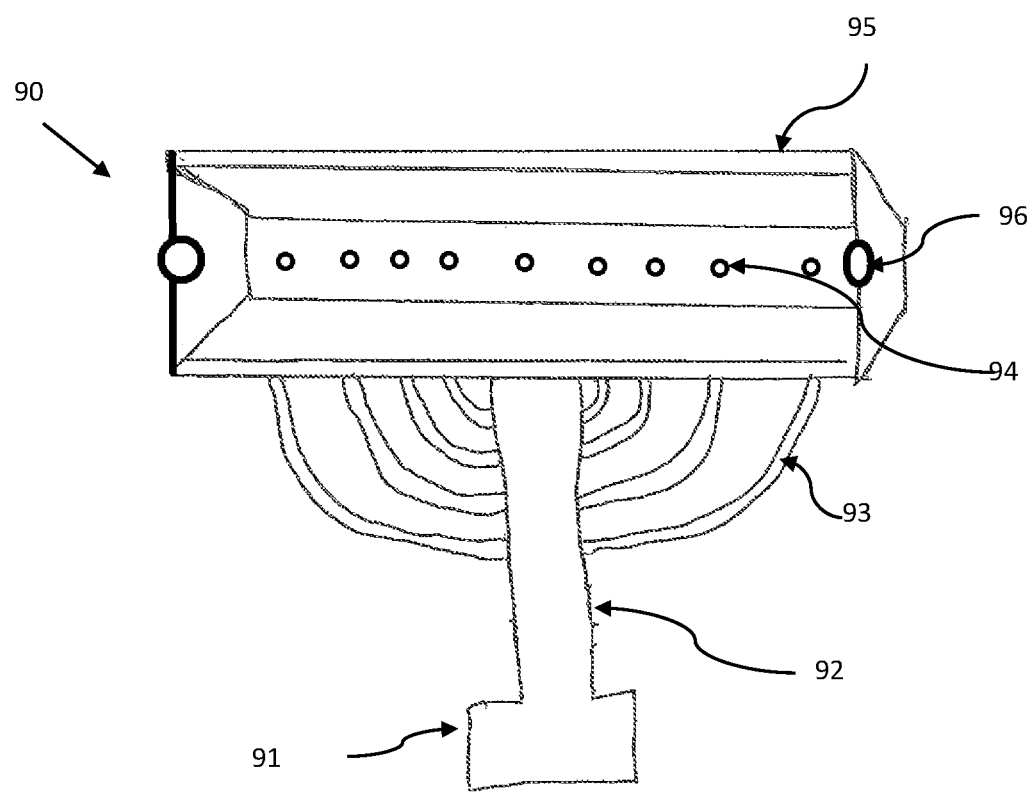
FIG. 5 illustrates a front view of a roller applicator. Note that the actual commercially available roller is not shown in this view. The applicator (90) attaches to the outlet end of the control wand (40) via a fitting (91) at the end of a central hollow tube (92). Multiple flexible tubes (93) convey paint from the central tube (92) to distribution holes (94) in the paint trough (95). Commercially available paint rollers (not shown) connect to the applicator via the roller end cap bushings (96) on either end of the applicator tool. Paint flows from the control wand (40) through the supply tubes (92,93) and out the distribution holes (94) where it is spread on the roller.

The electric pump (20) is turned on and off from a switch (41) located in the control wand (40). This allows the painter to control the flow of paint from the reservoir tank (10) to the paint applicator. The paint applicator may be either a roller, brush or cut in tool modified to be utilized with the portable power paint system. Examples of modified paint applicators are illustrated in FIGS. 2 through 5.

The components of the portable paint system described above are available commercially. Suitable paint pump and batteries are available from Ryobi® LTD. Corporation.

The invention may be used with either interior or exterior paints. It may also be used with stains.

A Potential patent classification for this invention is Class 401 Coating Implements with Material Supply; Sub-Class 118 Supply Container and Independent Applicator.

As seen by the descriptions above and the various illustration, this invention may be embodied in many different forms and should not be construed as limited to the embodiments set forth herein. It will be understood by those skilled in the art that changes in forms and details may be made without departing from the spirit and scope of the present application. It is therefore intended that the present invention not be limited to the exact forms and details described and illustrated herein, but falls within the scope of the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a stricture or feature that is disposed "adjacent" another feature may have portions that overlap or underlie the adjacent feature.

The invention claimed is:

1. A portable, battery-powered cut-in tool for the application of paint to a surface, comprising:
    a paint reservoir;
    a battery pack;
    an electrically powered pump operative to pump paint from the paint reservoir;
    tubing to convey the paint pumped from the paint reservoir to a hollow, hand-held control wand terminating in a distal end;
    a paint cut-in tool coupled to the distal end of the hand-held control wand, the paint cut-in tool including a paint applicator having a back side and a front side;
    wherein the paint applicator further includes a plurality of paint distribution holes extending therethrough from the back side of the paint applicator to the front side thereof;
    a plurality of paint distribution tubes, each paint distribution tube having a first end in fluid communication with the hollow control wand and a second end directly coupled to a respective one of the paint distribution holes on the back side of the paint applicator;
    wherein the paint applicator has a front edge, a back edge, and two side edges, and wherein each paint distribution hole extending from the back side to the front side of the paint applicator is spaced apart at a different point between the front and back edges of the paint applicator, and at a different point between the two side edges of the paint applicator; and
    a manually operated on/off switch on the control wand, whereby activation of the manually operated switch causes the user-worn battery pack to energize the electrically powered pump to pump paint from the paint reservoir, through the hand-held control wand and paint distribution tubes, to the front side of the paint applicator to apply the paint to a surface.

2. The painting cut-in tool of claim 1, wherein the paint applicator is rectangular.

3. The painting cut-in tool of claim 1, wherein the paint distribution tubes are flexible.

4. The painting cut-in tool of claim 1, wherein the battery pack contains one or more 18-volt rechargeable batteries.

5. The painting cut-in tool of claim 1, including at least three paint distribution holes and corresponding paint distribution tubes.

6. The painting cut-in tool of claim 1, wherein the paint reservoir, battery pack, pump and wand are all user-carried.

* * * * *